(12) United States Patent
Jesurajan Marystella et al.

(10) Patent No.: US 11,249,533 B2
(45) Date of Patent: Feb. 15, 2022

(54) SYSTEMS AND METHODS FOR ENABLING POWER BUDGETING IN AN INFORMATION HANDLING SYSTEM COMPRISING A PLURALITY OF MODULAR INFORMATION HANDLING SYSTEMS

(71) Applicant: Dell Products L.P., Round Rock, TX (US)

(72) Inventors: Anto DolphinJose Jesurajan Marystella, Round Rock, TX (US); Craig A. Klein, Elgin, TX (US); Arun Muthaiyan, Round Rock, TX (US); Nagesh Babu Venkata Doddapaneni, Tpe (TW); Somenath Das, Austin, TX (US); Mark Tsai, Tucheng (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/907,965

(22) Filed: Jun. 22, 2020

(65) Prior Publication Data
US 2021/0397240 A1    Dec. 23, 2021

(51) Int. Cl.
*G06F 1/32* (2019.01)
*G06F 9/54* (2006.01)
(Continued)

(52) U.S. Cl.
CPC .............. *G06F 1/3209* (2013.01); *G06F 1/28* (2013.01); *G06F 1/3287* (2013.01); *G06F 9/542* (2013.01)

(58) Field of Classification Search
CPC ....................................................... G06F 1/28
See application file for complete search history.

(56) References Cited

U.S. PATENT DOCUMENTS

| 7,457,976 | B2 * | 11/2008 | Bolan | G06F 1/263 |
| | | | | 713/300 |
| 7,555,666 | B2 * | 6/2009 | Brundridge | G06F 1/3203 |
| | | | | 713/300 |

(Continued)

*Primary Examiner* — Jaweed A Abbaszadeh
*Assistant Examiner* — Cheri L Harrington
(74) *Attorney, Agent, or Firm* — Jackson Walker L.L.P.

(57) ABSTRACT

A method may include, in a system comprising a plurality of power supply units, determining a redundancy configuration of the plurality of power supply units, determining a power capacity of the plurality of power supply units, determining a number of modular information handling systems installed in the system, determining a chassis-level maximum transient power limit for each of the modular information handling systems based on the redundancy configuration, the power capacity, and the number of modular information handling systems, determining a chassis-level maximum average power limit for each of the modular information handling systems, and communicating the chassis-level maximum transient power limit and chassis-level maximum average power limit to a respective baseboard management controller of each of the modular information handling systems, wherein each respective baseboard management controller is configured to determine if sled-level power requirements of its respective information handling system are within the chassis-level maximum transient power limit and chassis-level maximum average power limit.

17 Claims, 3 Drawing Sheets

(51) Int. Cl.
  *G06F 1/28*     (2006.01)
  *G06F 1/3209*   (2019.01)
  *G06F 1/3287*   (2019.01)

(56) References Cited

U.S. PATENT DOCUMENTS

| | | | | |
|---|---|---|---|---|
| 8,205,103 B2* | 6/2012 | Kazama | ............... | G06F 1/28 713/300 |
| 9,336,106 B2* | 5/2016 | Phuong | ............... | G06F 11/2284 |
| 9,958,923 B2* | 5/2018 | Bolan | ............... | G06F 1/263 |
| 2007/0118771 A1* | 5/2007 | Bolan | ............... | G06F 1/263 713/300 |
| 2007/0150757 A1* | 6/2007 | Aldereguia | ............... | G06F 1/3209 713/300 |
| 2007/0245162 A1* | 10/2007 | Loffink | ............... | G06F 1/32 713/300 |
| 2007/0260897 A1* | 11/2007 | Cochran | ............... | G06F 1/3203 713/300 |
| 2008/0222435 A1* | 9/2008 | Bolan | ............... | G06F 1/3203 713/310 |
| 2009/0119523 A1* | 5/2009 | Totten | ............... | G06F 1/26 713/322 |
| 2009/0265564 A1* | 10/2009 | Clemo | ............... | G06F 1/26 713/300 |
| 2010/0064150 A1* | 3/2010 | Higuchi | ............... | G06F 1/30 713/300 |
| 2011/0314318 A1* | 12/2011 | Sawai | ............... | G06F 11/2015 713/340 |
| 2013/0268779 A1* | 10/2013 | Hueston | ............... | G06F 1/3206 713/300 |
| 2014/0052309 A1* | 2/2014 | Chandrasekhar | ............... | G06F 1/26 700/297 |
| 2014/0310537 A1* | 10/2014 | Messick | ............... | G06F 1/263 713/300 |
| 2015/0301914 A1* | 10/2015 | Phuong | ............... | G06F 1/3293 713/322 |
| 2016/0077570 A1* | 3/2016 | Varadarajan | ............... | H04L 12/10 713/322 |
| 2017/0031431 A1* | 2/2017 | Khatri | ............... | G06F 1/3234 |
| 2017/0336841 A1* | 11/2017 | Ragupathi | ............... | G06F 9/4411 |
| 2020/0042068 A1* | 2/2020 | Rong | ............... | G06F 1/3209 |

* cited by examiner

SYSTEMS AND METHODS FOR ENABLING POWER BUDGETING IN AN INFORMATION HANDLING SYSTEM COMPRISING A PLURALITY OF MODULAR INFORMATION HANDLING SYSTEMS

TECHNICAL FIELD

The present disclosure relates in general to information handling systems, and more particularly to methods and systems for power budgeting in an information handling system comprising a plurality of modular information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some data center servers are equipped with chassis manager firmware, which manages power supply units and the redundancy configuration of the power supply units. Individual information handling system server nodes made be managed by a baseboard management controller having a handshake with the chassis manager via an Internet Protocol Management Bus (IPMB).

Existing chassis manager firmware does support power budgeting and management, often resulting in a less than ideal customer experience. Server nodes in existing server architectures may draw power immediately on a power button press, without a power budget check, sometimes resulting in throttling and poor performance, and in some cases cause complete chassis shutdown when the chassis power consumption exceeds the power supply capacity. Also, lack of power budgeting in existing approaches prevents calculation of lower and upper boundaries for power capping. For example, existing approaches were unable to calculate a fast throttle boundary (FTB), a node lower boundary (NLB), or to protect power supply units and prevent exothermic events while maximizing the system performance via a hardware protection policy (HWPP) defining an average power limit for a server node.

SUMMARY

In accordance with the teachings of the present disclosure, the disadvantages and problems associated with existing approaches to managing power in an information handling system may be reduced or eliminated.

In accordance with embodiments of the present disclosure, a method may include, in a system comprising a plurality of power supply units, determining a redundancy configuration of the plurality of power supply units, determining a power capacity of the plurality of power supply units, determining a number of modular information handling systems installed in the system, determining a chassis-level maximum transient power limit for each of the modular information handling systems based on the redundancy configuration, the power capacity, and the number of modular information handling systems, determining a chassis-level maximum average power limit for each of the modular information handling systems, and communicating the chassis-level maximum transient power limit and chassis-level maximum average power limit to a respective baseboard management controller of each of the modular information handling systems, wherein each respective baseboard management controller is configured to determine if sled-level power requirements of its respective information handling system are within the chassis-level maximum transient power limit and chassis-level maximum average power limit.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in a system comprising a plurality of power supply units: determine a redundancy configuration of the plurality of power supply units, determine a power capacity of the plurality of power supply units, determine a number of modular information handling systems installed in the system, determine a chassis-level maximum transient power limit for each of the modular information handling systems based on the redundancy configuration, the power capacity, and the number of modular information handling systems, determine a chassis-level maximum average power limit for each of the modular information handling systems, and communicate the chassis-level maximum transient power limit and chassis-level maximum average power limit to a respective baseboard management controller of each of the modular information handling systems, wherein each respective baseboard management controller is configured to determine if sled-level power requirements of its respective information handling system are within the chassis-level maximum transient power limit and chassis-level maximum average power limit.

In accordance with these and other embodiments of the present disclosure, a management module configured to be communicatively coupled to a plurality of power supply units and may be further configured to determine a redundancy configuration of the plurality of power supply units, determine a power capacity of the plurality of power supply units, determine a number of modular information handling systems installed in a system, determine a chassis-level maximum transient power limit for each of the modular information handling systems based on the redundancy configuration, the power capacity, and the number of modular information handling systems, determine a chassis-level maximum average power limit for each of the modular information handling systems, and communicate the chassis-level maximum transient power limit and chassis-level maximum average power limit to a respective baseboard management controller of each of the modular information handling systems, wherein each respective baseboard management controller is configured to determine if sled-level power requirements of its respective information handling system are within the chassis-level maximum transient power limit and chassis-level maximum average power limit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
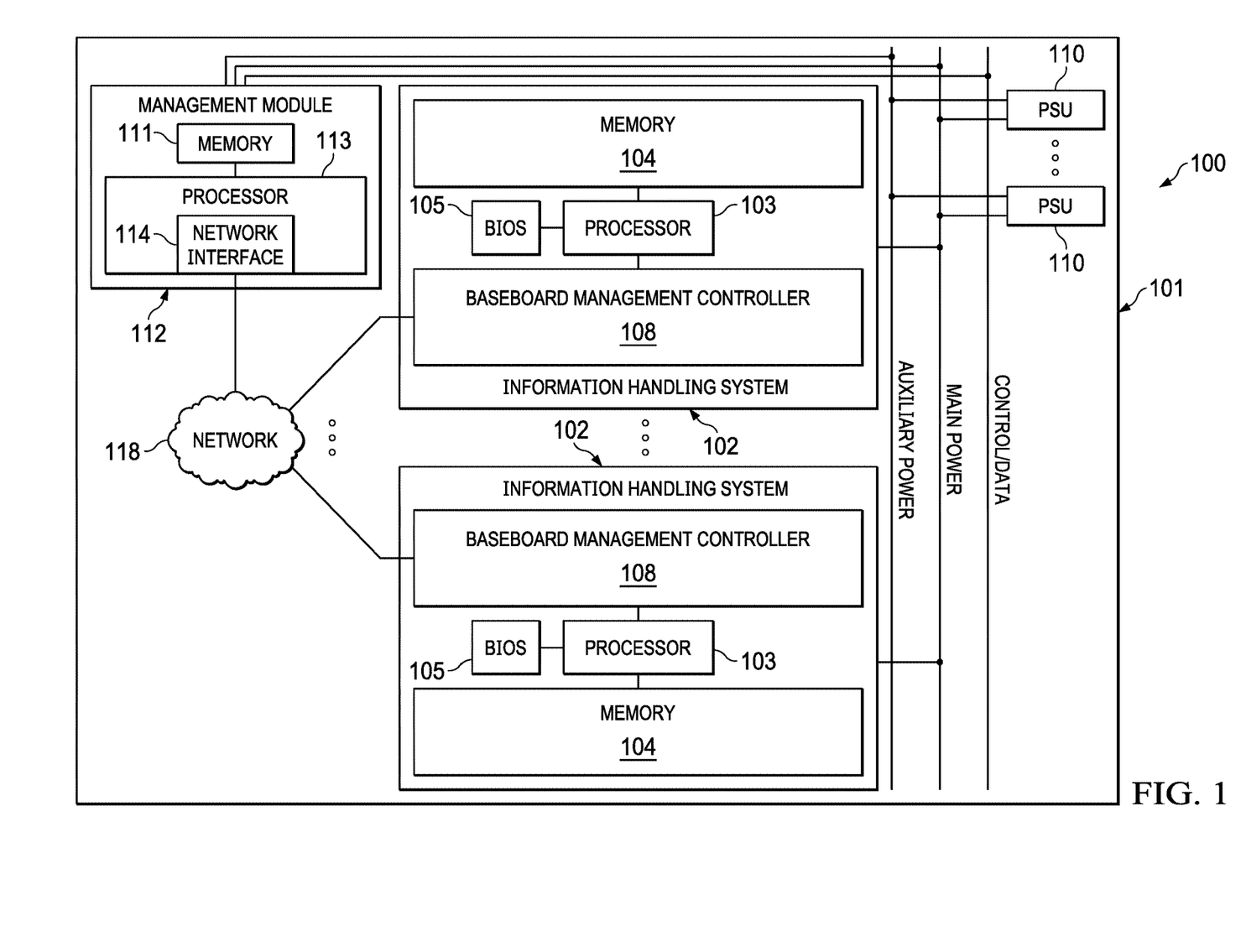
FIG. 1 illustrates a block diagram of an example system, in accordance with embodiments of the present disclosure.
Figure 2:
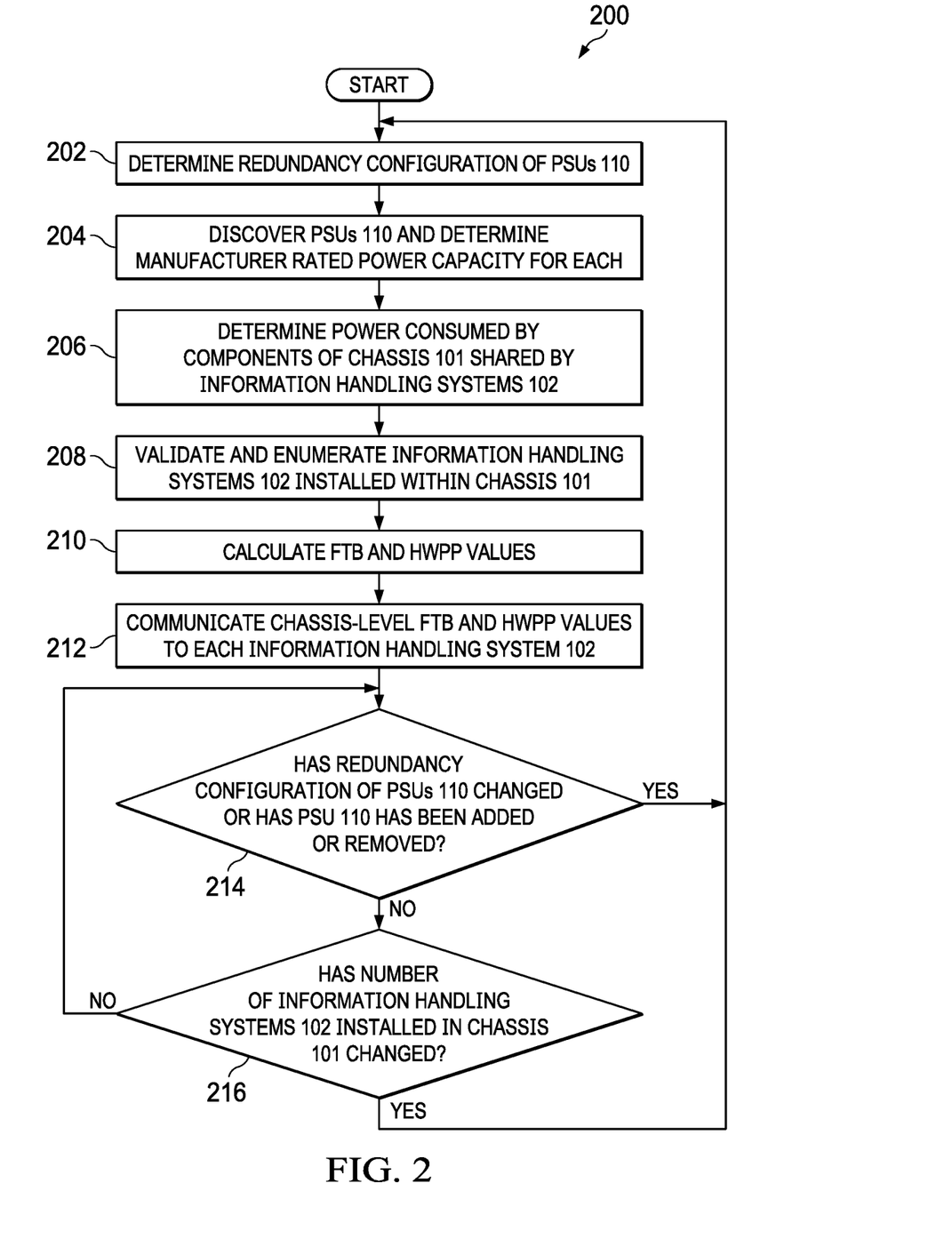
FIG. 2 illustrates a flow chart of an example method for enabling, at the level of a chassis manager, power budgeting in a chassis comprising a plurality of modular information handling systems, in accordance with embodiments of the present disclosure.
Figure 3:
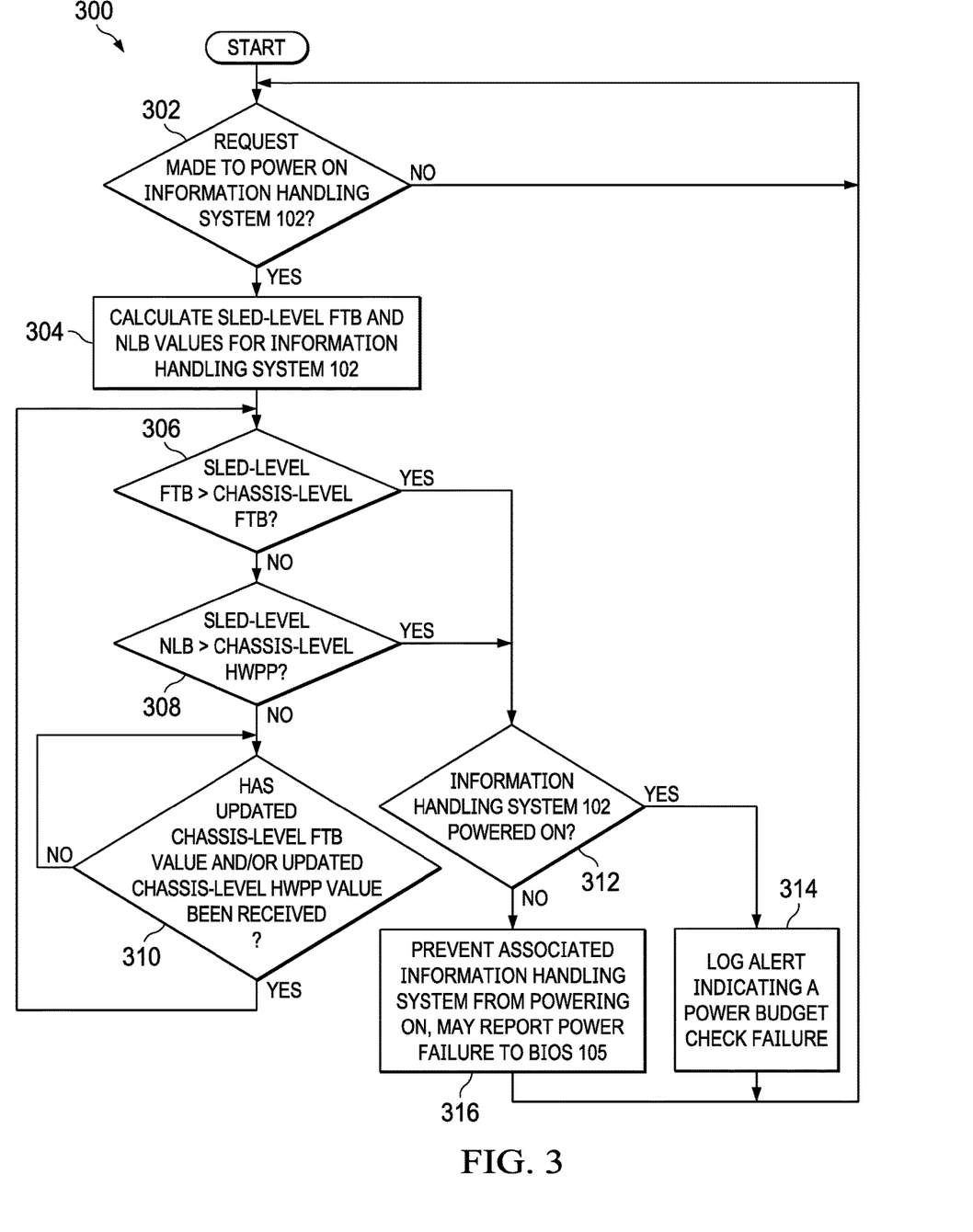
FIG. 3 illustrates a flow chart of an example method for enabling, at the level of a baseboard management controller, power budgeting in a chassis comprising a plurality of modular information handling systems, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100, in accordance with embodiments of the present disclosure. As shown in FIG. 1, system 100 may comprise a chassis 101 for enclosing a plurality of information handling resources, including a plurality of modular information handling systems 102 (e.g., sleds), a management module 112, an internal network 118, and a power system comprising one or more power supply units (PSUs) 110.

Chassis 101 may include any suitable enclosure for housing the various components of system 100, and may also be referred to as a rack, tower, enclosure, and/or housing.

As shown in FIG. 1, an information handling system 102 may include a processor 103, a memory 104 communicatively coupled to processor 103, a basic input/output system (BIOS) 105 communicatively coupled to processor 103, and a baseboard management controller 108 communicatively coupled to processor 103.

A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in an associated memory 104 and/or another component of its associated information handling system 102.

A memory 104 may be communicatively coupled to an associated processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

A BIOS 105 may be communicatively coupled to an associated processor 103 and may include any system, device, or apparatus configured to identify, test, and/or initialize information handling resources of an associated information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, a BIOS 105 may comprise boot firmware configured to be the first code executed by processor 103 when information handling system 102 is booted and/or powered on. As part of its initialization functionality, BIOS 105 code may be configured to set components of information handling system 102 into a known state, so that one or more applications (e.g., an operating system or other application programs) stored on compatible media (e.g., memory 104) may be executed by processor 103 and given control of information handling system 102.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller or Integrated Dell Remote Access Controller).

Although, for the purposes of clarity and exposition, FIG. 1 depicts only two information handling systems 102 within system 100, it is understood that system 100 may comprise any suitable number of information handling systems 102.

In addition to a processor 103, a memory 104, BIOS 105, and a baseboard management controller 108, an information handling system 102 may include one or more other information handling resources. For example, in some embodiments, an information handling system 102 may include more than one memory 104. As another example, in some embodiments, an information handling system 102 may include a programmable logic device (e.g., integral to or separate from baseboard management controller 108).

Management module 112 may be configured to provide out-of-band management facilities for management of shared chassis infrastructure of system 100, such as air movers, PSUs 110, and/or other components shared by a plurality of information handling systems 102. Such management may be made by management module 112 even if system 100 is powered off or powered to a standby state. Management module 112 may include a processor 113 and one or more memories 111. In certain embodiments, management module 112 may include or may be an integral part of an enclosure controller (EC). In other embodiments, management module 112 may include or may be an integral part of a chassis management controller (CMC). In some embodiments, management module 112 may also be referred to as a "chassis manager."

Although, for the purposes of clarity and exposition, FIG. 1 depicts only one management module 112, it is understood that system 100 may comprise any suitable number of management modules 112. For example, in some embodiments, two management modules 112 may be arranged in a redundant configuration, in which, at a given moment, one management module 112 may be "active" in that it is actively functional and performing its functionality, while another management module 112 is in a "standby" mode and may become active in the event that the active management module 112 experiences a fault or failure that causes it to failover to the standby management module 112.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions (e.g., firmware) and/or process data stored in memory 111 and/or another component of system 100 or management module 112. In some embodiments, processor 113 may comprise an enclosure controller configured to execute firmware relating to functionality as an enclosure controller. As shown in FIG. 1, processor 113 may include a network interface 114 for communicating with an internal network 118 of system 100.

Memory 111 may be communicatively coupled to processor 113 and may include any system, device, or apparatus configured to retain program instructions and/or data for a period of time (e.g., computer-readable media). Memory 111 may include RAM, EEPROM, a PCMCIA card, flash memory, magnetic storage, opto-magnetic storage, or any suitable selection and/or array of volatile or non-volatile memory that retains data after power to management module 112 is turned off.

Internal network 118 may comprise any suitable system, apparatus, or device operable to serve as communication infrastructure for network interface 114 to communicate to one or more other components, such as baseboard management controllers 108 of information handling systems 102. In some embodiments, internal network 118 may implement an Internet Protocol Management Bus (IPMB).

Generally speaking, a PSU 110 may include any system, device, or apparatus configured to supply electrical current to one or more information handling resources of system 100. As shown in FIG. 1, a PSU 110 may provide electrical energy via (a) a main power rail, indicated in FIG. 1 as "MAIN POWER," and (b) an auxiliary power rail, indicated in FIG. 1 as "AUX POWER." The main power rail may generally be used to provide power to information handling resources of an information handling system 102 when such information handling system 102 is turned on and/or to provide power to certain components of system 100. On the other hand, the auxiliary power rail may generally be used to provide power to certain auxiliary information handling resources when energy is not supplied via the main power rail. For example, the auxiliary power rail may be used to provide power to baseboard management controller 108 when electrical energy is not provided to processor 103, memory 104, and/or other information handling resources via the main power rail. As another example, the auxiliary power rail may be used to provide power to management module 112 when electrical energy is not provided to information handling resources 102 via the main power rail.

In some embodiments, a management module 112 may be configured to communicate with one or more PSUs 110 to communicate control and/or telemetry data between management module 112 and PSUs 110. For example, a PSU 110 may communicate information regarding specifications (e.g., power rating, maximum current, etc.) and/or measurements of electrical parameters (e.g., electrical currents or voltages) present within such PSU 110.

In addition to information handling systems 102, management modules 112, internal network 118, and PSUs 110, system 100 may include one or more other information handling resources. As an example, in some embodiments, an information handling system 102 may include a programmable logic device (e.g., integral to or separate from management module 112).

In operation, as described in greater detail below, in a modular system including multiple information handling systems 102, management module 112 may be configured to determine power budget values and power limit values for information handling systems 102 and pass such values to baseboard management controllers 108 via internal network 118. With such values, an information handling system 102 may be enabled to, during BIOS power-on/self-test, determine and report any insufficiency of power.

Further, management module 112 may be configured to allocate power to individual modular information handling systems 102 based on a number of modular information handling systems 102 present in chassis 101 and a redundancy configuration of PSUs 110.

In addition, such power budget values, power limit values, and allocation of power may be orchestrated around image verification checks by BIOS 105 in order to allow a BIOS 105 of each information handling system 102 to allow or block information handling system 102 from powering on. Such image verification check may be performed initially when alternating current (AC) power is applied to PSUs 110, as well as on every subsequent request by an information handling system 102 to power on.

Moreover, using the systems and methods described herein, multiple simultaneous BIOS image verifications may be avoided and a continuous loop of failed verifications may be avoided. A power inventory and modular information handling system 102 powering on procedure may be sequences based on verification results.

Among the advantages of the systems and methods disclosed herein is that they may provide a cost-effective approach to provide a power budget check alert and power control without the complexity and cost of enclosure controllers that are often used for power budgeting. Instead, the systems and methods disclosed herein may take advantage of a built-in power budget and power control infrastructure of management module 112, baseboard management controller 108, and BIOS 105. For example, the systems and methods disclosed herein may:

- leverage an existing hardware protection policy (HWPP) for power control to avoid overconsumption;
- leverage an existing baseboard management controller-BIOS handshake power budget checks; and/or
- leverage the power management capabilities of a baseboard management controller (e.g., iDRAC Power Manager SMBAlert) power excursion by PSUs 110.

A power limit calculated by management module 112 may include a per-information handling system 102 full-throttle boundary (FTB). FTB limits may be influenced by effective capacity of PSUs 110 and a redundancy configuration of PSUs 110. The FTB calculation may determine maximum transient peak power events expected at outputs of PSUs 110.

To further illustrate, management module 112 may calculate FTB as:

$$FTB=(P_{OUT}*EPR-P_{SHARED})/N$$

wherein:

$P_{OUT}$=effective output capacity of PSUs 110 (e.g., manufacturer-rated maximum power output multiplied by a redundancy factor $PSU_{COUNT}$);

$PSU_{COUNT}$=1 for grid redundant configuration; 2 for non-redundant configuration;

EPR=an extended power output range of PSUs 110 (e.g., 1.4);

$P_{SHARED}$=power consumed by components of chassis 101 shared by all information handling systems 102 (e.g., chassis backplane, management module 112, air movers, etc.); and N=a number of information handling systems 102 installed in chassis 101.

Thus, as an example, assuming two PSUs 110 each having a manufacturer rated capacity of 2400 W in a redundant configuration, 357 W of power consumed by shared components of chassis 101, and four information handling system 102, management module 112 may calculate FTB as follows:

$$FTB=(P_{OUT}*EPR-P_{SHARED})/N$$

$$=(2400\ W*11.4-357\ W)/4$$

32 750 W

Management module 112 may communicate FTB to each information handling system 102 via internal network 118, along with an HWPP defining an average power consumption limit for each information handling system 102. The HWPP may serve as a node lower bound (NLB) for each information handling system 102.

During power-on/self-test, BIOS 105 of an information handling system 102 may compare its own calculated sled-level FTB to the chassis-level FTB received from management module 112. If the sled-level FTB is greater than the chassis-level FTB, BIOS 105 may fail its power budget check.

Similarly, during power-on/self-test, BIOS 105 of an information handling system 102 may compare its own calculated sled-level NLB to the sled-level HWPP (which may be the lesser of the HWPP received from management module 112 and a sled-connector maximum). If the sled-level NLB is greater than the sled-level HWPP, BIOS 105 may fail its power budget check.

A BIOS 105 may pass power budget checks only if both FTB and NLB checks pass for its associated information handling system 102. If either of these checks fail, BIOS 105 may prevent information handling system 102 from fully powering on (e.g., boot of information handling system 102 may halt at the end of power-on/self-test with a halt F1/F2 message).

For power budget check failure scenarios described above, baseboard management controller 108 may log an error for power budget failure. Each information handling system 102 may be addressed independently for failure scenarios.

The FTB and HWPP values calculated by management module 112 may dynamically change in the event an information handling system 102 is added or removed from chassis 101, if the redundancy configuration of PSUs 110 is modified (e.g., by a user), or if a PSU 110 is added (or powered on) or removed (or powered down, loses AC "power OK").

To illustrate, when a modular information handling system 102 is added or removed from chassis 101, management module 112 may calculate new FTP and HWPP values and communicate such updated values to each modular information handling system 102. When a modular information handling system 102 receives the updated chassis-level FTB and HWPP values, it may again compare such values against its sled-level FTB and NLB values, respectively. If either sled-level value exceeds its respective chassis-level value, baseboard management controller 108 may log a "system power budget exceeds PSU capacity." However, at this point any information handling systems 102 that are currently on may not be shut down or restarted due to this power budget check. Any hardware limits may be addressed by baseboard management controller 108 using HWPP, which may always remain enabled.

When a redundancy configuration of PSUs 110 is changed or a PSU 110 is added or removed, management module 112 may recalculate the FTB and HWPP values, communicate such values to information handling systems 102, and baseboard management controllers 108 may perform power budget checks as described above.

FIG. 2 illustrates a flow chart of an example method 200 for enabling, at the level of management module 112, power budgeting in chassis 101 comprising a plurality of modular information handling systems 102, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

Method 200 may start at step 202 in response to a powering on or restart of management module 112.

At step 202, management module 112 may determine a redundancy configuration of PSUs 110. At step 204, management module 112 may discover PSUs 110 and determine the manufacturer rated power capacity for each. At step 206, management module 112 may determine a power consumed by components of chassis 101 shared by information handling systems 102. At step 208, management module 112 may validate and enumerate information handling systems 102 installed within chassis 101.

At step 210, management module 112 may calculate FTB and HWPP values based on information collected at steps 202-208. At step 212, management module 112 may communicate these chassis-level FTB and HWPP values to each information handling system 102.

At step 214, management module 112 may determine if a redundancy configuration of PSUs 110 has changed or a PSU 110 has been added or removed. If a redundancy configuration of PSUs 110 has changed or a PSU 110 has been added or removed, method 200 may proceed again to step 202. Otherwise, method 200 may proceed to step 216.

At step 216, management module 112 may determine if the number of information handling systems 102 installed in chassis 101 has changed. If the number of information handling systems 102 installed in chassis 101 has changed, method 200 may proceed again to step 202. Otherwise, method 200 may proceed again to step 214.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a baseboard management controller 108, and/or any other system operable to implement method 200. In certain embodiments, method 200 may be implemented partially or fully in software and/or firmware embodied in computer-readable media.

FIG. 3 illustrates a flow chart of an example method 300 for enabling, at the level of a baseboard management controller 108, power budgeting in chassis 101 comprising a plurality of modular information handling systems 102, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

Method 300 may start at step 302 in response to a powering on or restart of an information handling system 102, which may initialize operation of a baseboard management controller 108.

At step 302, baseboard management controller 108 may determine if a request has been made to power on information handling system 102. If a request has been made to power on information handling system 102, method 300 may proceed to step 304. Otherwise, step 302 may repeat until a request has been made to power on information handling system 102.

At step 304, baseboard management controller 108 may calculate sled-level FTB and NLB values for its associated information handling system 102.

At step 306, baseboard management controller 108 may determine if its sled-level FTB exceeds a chassis-level FTB communicated from management module 112. If the sled-level FTB value exceeds a chassis-level FTB value communicated from management module 112, method 300 may proceed to step 312. Otherwise, method 300 may proceed to step 308.

At step 308, baseboard management controller 108 may determine if its sled-level NLB value exceeds a chassis-level HWPP value communicated from management module 112. If the sled-level NLB value exceeds a chassis-level HWPP value communicated from management module 112, method 300 may proceed to step 312. Otherwise, method 300 may proceed to step 310.

At step 310, baseboard management controller 108 may determine if an updated chassis-level FTB value and/or updated chassis-level HWPP value has been received from management module 112. If an updated chassis-level FTB value and/or updated chassis-level HWPP value has been received from management module 112, method 300 may proceed again to step 306. Otherwise, method 300 may remain at step 310 until an updated chassis-level FTB value and/or updated chassis-level HWPP value has been received from management module 112.

At step 312, baseboard management controller 108 may determine if its associated information handling system 102 is powered on (e.g., in power state S0). If the associated information handling system 102 is powered on, method 300 may proceed to step 314. Otherwise, method 300 may proceed to step 316.

At step 314, baseboard management controller 108 may log an alert indicating a power budget check failure. After completion of step 314, method 300 may proceed again to step 302.

At step 316, baseboard management controller 108 may prevent its associated information handling system 102 from powering on, and may report a power failure to BIOS 105 (e.g., with a halt F1/F2 message). After completion of step 316, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using a baseboard management controller 108, and/or any other system operable to implement method 300. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method comprising, in a system comprising a plurality of power supply units:

determining a redundancy configuration of the plurality of power supply units;

determining a power capacity of the plurality of power supply units;

determining a number of modular information handling systems installed in the system;

determining a chassis-level maximum transient power limit for each of the modular information handling systems based on the redundancy configuration, the power capacity, and the number of modular information handling systems;

determining a chassis-level maximum average power limit for each of the modular information handling systems; and communicating the chassis-level maximum transient power limit for each of the modular information handling systems and the chassis-level maximum average power limit for each of the modular information handling systems to a respective baseboard management controller of each of the modular information handling systems, wherein each respective baseboard management controller is configured to determine if sled-level power requirements of its respective information handling system are within the chassis-level maximum transient power limit for each of the modular information handling systems and the chassis-level maximum average power limit for each of the modular information handling systems;

wherein each baseboard management controller is configured to, responsive to determining that sled-level power requirements of its respective information handling system exceed either of chassis-level maximum transient power limit and chassis-level maximum average power limit, prevent powering on of the respective information handling system such baseboard management controller is integral to.

2. The method of claim 1, further comprising:

determining a power consumed by components of the system shared by the modular information handling systems; and further determining the chassis-level maximum transient power limit for each of the modular information handling systems based on the power consumed by components of the system shared by the modular information handling systems.

3. The method of claim 1, further comprising updating the chassis-level maximum transient power limit for each of the modular information handling systems responsive to a change in the redundancy configuration of the plurality of power supply units.

4. The method of claim 1, further comprising:

updating the chassis-level maximum transient power limit for each of the modular information handling systems responsive to a change in the number of modular information handling systems installed in the system; and communicating the chassis-level maximum transient power limit for each of the modular information handling systems as updated to the respective baseboard management controller of each of the modular information handling systems.

5. The method of claim 1, wherein the chassis-level maximum transient power limit for each of the modular information handling systems and the chassis-level maximum average power limit for each of the modular information handling systems is communicated from a management module via an internal communication network of the system.

6. The method of claim 1, wherein each baseboard management controller is configured to, responsive to determining that sled-level power requirements of its respective information handling system exceed either of the chassis-level maximum transient power limit for each of the modular information handling systems and the chassis-level maximum average power limit for each of the modular information handling systems, generate an alert indicating a power check failure of the respective information handling system such baseboard management controller is integral to.

7. An article of manufacture comprising:
a non-transitory computer-readable medium; and
computer-executable instructions carried on the computer-readable medium, the instructions readable by a processor, the instructions, when read and executed, for causing the processor to, in a system comprising a plurality of power supply units:
determine a redundancy configuration of the plurality of power supply units;
determine a power capacity of the plurality of power supply units;
determine a number of modular information handling systems installed in the system;
determine a chassis-level maximum transient power limit for each of the modular information handling systems based on the redundancy configuration, the power capacity, and the number of modular information handling systems;
determine a chassis-level maximum average power limit for each of the modular information handling systems; and
communicate the chassis-level maximum transient for each of the modular information handling systems power limit and the chassis-level maximum average power limit for each of the modular information handling systems to a respective baseboard management controller of each of the modular information handling systems, wherein each respective baseboard management controller is configured to determine if sled-level power requirements of its respective information handling system are within the chassis-level maximum transient power limit for each of the modular information handling systems and the chassis-level maximum average power limit for each of the modular information handling systems;
wherein each baseboard management controller is configured to, responsive to determining that sled-level power requirements of its respective information handling system exceed either of chassis-level maximum transient power limit and chassis-level maximum average power limit, prevent powering on of the respective information handling system such baseboard management controller is integral to.

8. The article of manufacture of claim 7, the instructions for further causing the processor to:
determine a power consumed by components of the system shared by the modular information handling systems; and
further determine the chassis-level maximum transient power limit for each of the modular information handling systems based on the power consumed by components of the system shared by the modular information handling systems.

9. The article of manufacture of claim 7, the instructions for further causing the processor to update the chassis-level maximum transient power limit for each of the modular information handling systems responsive to a change in the redundancy configuration of the plurality of power supply units.

10. The article of manufacture of claim 7, the instructions for further causing the processor to:
update the chassis-level maximum transient power limit for each of the modular information handling systems responsive to a change in the number of modular information handling systems installed in the system; and
communicate the chassis-level maximum transient power limit for each of the modular information handling systems as updated to the respective baseboard management controller of each of the modular information handling systems.

11. The article of manufacture of claim 7, wherein the chassis-level maximum transient power limit for each of the modular information handling systems and the chassis-level maximum average power limit for each of the modular information handling systems is communicated from a management module via an internal communication network of the system.

12. The article of manufacture of claim 7, wherein each baseboard management controller is configured to, responsive to determining that sled-level power requirements of its respective information handling system exceed either of chassis-level maximum transient power limit for each of the modular information handling systems and chassis-level maximum average power limit for each of the modular information handling systems, generate an alert indicating a power check failure of the respective information handling system such baseboard management controller is integral to.

13. A management module configured to be communicatively coupled to a plurality of power supply units and further configured to:
determine a redundancy configuration of the plurality of power supply units;
determine a power capacity of the plurality of power supply units;
determine a number of modular information handling systems installed in a system;
determine a chassis-level maximum transient power limit for each of the modular information handling systems based on the redundancy configuration, the power capacity, and the number of modular information handling systems;
determine a chassis-level maximum average power limit for each of the modular information handling systems; and
communicate the chassis-level maximum transient power limit for each of the modular information handling systems and the chassis-level maximum average power limit for each of the modular information handling systems to a respective baseboard management controller of each of the modular information handling systems, wherein each respective baseboard management controller is configured to determine if sled-level power requirements of its respective information handling system are within the chassis-level maximum transient power limit for each of the modular information handling systems and chassis-level maximum average power limit for each of the modular information handling systems;

wherein each baseboard management controller is configured to, responsive to determining that sled-level power requirements of its respective information handling system exceed either of chassis-level maximum transient power limit and chassis-level maximum average power limit, prevent powering on of the respective information handling system such baseboard management controller is integral to.

14. The management module of claim 13, further configured to:
 determine a power consumed by components of the system shared by the modular information handling systems; and
 further determine the chassis-level maximum transient power for each of the modular information handling systems limit based on the power consumed by components of the system shared by the modular information handling systems.

15. The management module of claim 13, further configured to update the chassis-level maximum transient power limit for each of the modular information handling systems responsive to a change in the redundancy configuration of the plurality of power supply units.

16. The management module of claim 13, further configured to:
 update the chassis-level maximum transient power limit for each of the modular information handling systems responsive to a change in the number of modular information handling systems installed in the system; and
 communicate the chassis-level maximum transient power limit for each of the modular information handling systems as updated to the respective baseboard management controller of each of the modular information handling systems.

17. The management module of claim 13, wherein each baseboard management controller is configured to, responsive to determining that sled-level power requirements of its respective information handling system exceed either of chassis-level maximum transient power limit for each of the modular information handling systems and chassis-level maximum average power limit for each of the modular information handling systems, generate an alert indicating a power check failure of the respective information handling system such baseboard management controller is integral to.

* * * * *

UNITED STATES PATENT AND TRADEMARK OFFICE
CERTIFICATE OF CORRECTION

PATENT NO. : 11,249,533 B2
APPLICATION NO. : 16/907965
DATED : February 15, 2022
INVENTOR(S) : Marystella et al.

It is certified that error appears in the above-identified patent and that said Letters Patent is hereby corrected as shown below:

In the Specification

Column 8, Lines 5-10, delete "
$$FTB = (P_{OUT} * EPR - P_{SHARED})/N$$
$$= (2400\ W * 11.4 - 357\ W)/4$$
$$32\ 750\ W$$
" and insert
$$FTB = (P_{OUT} * EPR - P_{SHARED})/N$$
$$= (2400\ W * 1 * 1.4 - 357\ W)/4$$
$$= 750\ W$$
--, therefor.

Signed and Sealed this
Thirteenth Day of December, 2022

Katherine Kelly Vidal
*Director of the United States Patent and Trademark Office*